US012568183B2

(12) United States Patent
Woody et al.

(10) Patent No.: US 12,568,183 B2
(45) Date of Patent: Mar. 3, 2026

(54) TRANSPORTING ULTRA-HIGH DEFINITION VIDEO FROM MULTIPLE SOURCES

(71) Applicant: Raytheon Company, Arlington, VA (US)

(72) Inventors: Carl A. Woody, McKinney, TX (US); Tyler Layne Hook, Little Elm, TX (US)

(73) Assignee: Raytheon Company, Arlington, VA (US)

(*) Notice: Subject to any disclaimer, the term of this patent is extended or adjusted under 35 U.S.C. 154(b) by 0 days.

(21) Appl. No.: 18/912,153

(22) Filed: Oct. 10, 2024

(65) Prior Publication Data

US 2025/0106351 A1     Mar. 27, 2025

Related U.S. Application Data

(60) Division of application No. 17/336,826, filed on Jun. 2, 2021, now Pat. No. 12,133,017, which is a continuation of application No. 15/455,726, filed on Mar. 10, 2017, now Pat. No. 11,190,724.

(51) Int. Cl.
| | |
|---|---|
| *H04N 5/77* | (2006.01) |
| *H04N 5/268* | (2006.01) |
| *H04N 7/01* | (2006.01) |
| *H04N 7/015* | (2006.01) |
| *H04N 7/08* | (2006.01) |
| *H04N 21/234* | (2011.01) |
| *H04N 21/236* | (2011.01) |
| *H04N 21/63* | (2011.01) |

(52) U.S. Cl.
CPC .............. *H04N 5/77* (2013.01); *H04N 5/268* (2013.01); *H04N 7/0127* (2013.01); *H04N 7/015* (2013.01); *H04N 7/08* (2013.01); *H04N 21/234* (2013.01); *H04N 21/23602* (2013.01); *H04N 21/631* (2013.01)

(58) Field of Classification Search
CPC ........ H04N 5/77; H04N 5/268; H04N 7/0127; H04N 7/015; H04N 7/08; H04N 21/234; H04N 21/23602; H04N 21/631
See application file for complete search history.

(56) References Cited

U.S. PATENT DOCUMENTS

| | | | | |
|---|---|---|---|---|
| 2008/0068458 A1* | 3/2008 | Carroll | .................... | H04N 7/181 348/E7.086 |
| 2013/0321570 A1* | 12/2013 | Ferren | .................. | H04N 21/437 348/42 |
| 2017/0272693 A1* | 9/2017 | Strein | .................. | H04J 3/0667 |

* cited by examiner

*Primary Examiner* — Thai Q Tran
*Assistant Examiner* — Jose M Mesa
(74) *Attorney, Agent, or Firm* — Schwegman Lundberg & Woessner, P.A.

(57) ABSTRACT

A sensor data processing apparatus can be coupled to multiple image sensors of different types. The apparatus adjusts frame transmission rates based on the number of sensors and type of image data sourced by the sensors to optimize utilization of bandwidth on a number of transport channels. The apparatus can be configured to transport selected frames in the image data that are identified as critical frames at a higher rate than non-selected frames in the image data.

16 Claims, 12 Drawing Sheets

200

25MP into a 720p Video Architecture 256016-bit Pixels

Pixel 1 & 2 map to pixel 1,
Pixel 3 & 4 map to pixel 2,
Pixel 5 & 6 map to pixel 3....

5120 Lines

404

51208-bit Pixels

5120 Lines

402

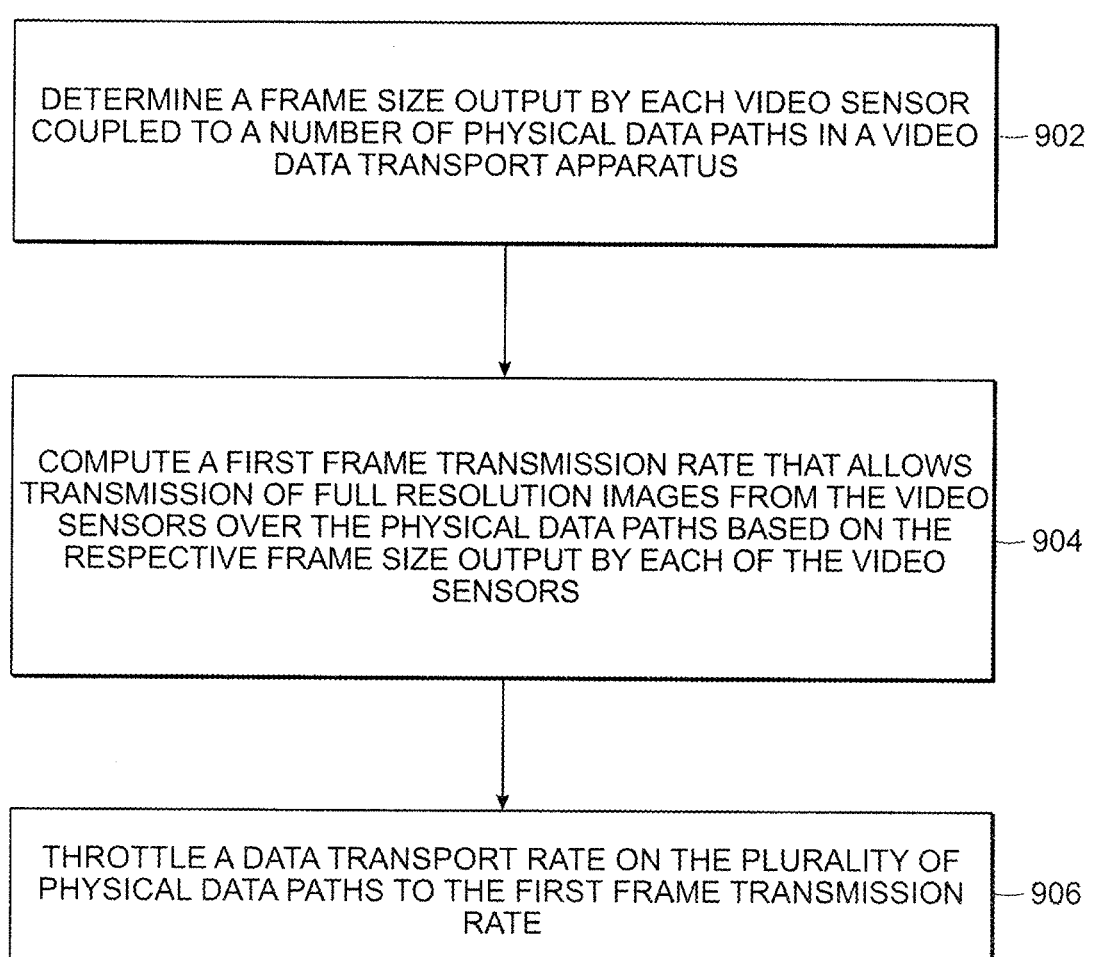

900

DETERMINE A FRAME SIZE OUTPUT BY EACH VIDEO SENSOR COUPLED TO A NUMBER OF PHYSICAL DATA PATHS IN A VIDEO DATA TRANSPORT APPARATUS —902

COMPUTE A FIRST FRAME TRANSMISSION RATE THAT ALLOWS TRANSMISSION OF FULL RESOLUTION IMAGES FROM THE VIDEO SENSORS OVER THE PHYSICAL DATA PATHS BASED ON THE RESPECTIVE FRAME SIZE OUTPUT BY EACH OF THE VIDEO SENSORS —904

THROTTLE A DATA TRANSPORT RATE ON THE PLURALITY OF PHYSICAL DATA PATHS TO THE FIRST FRAME TRANSMISSION RATE —906

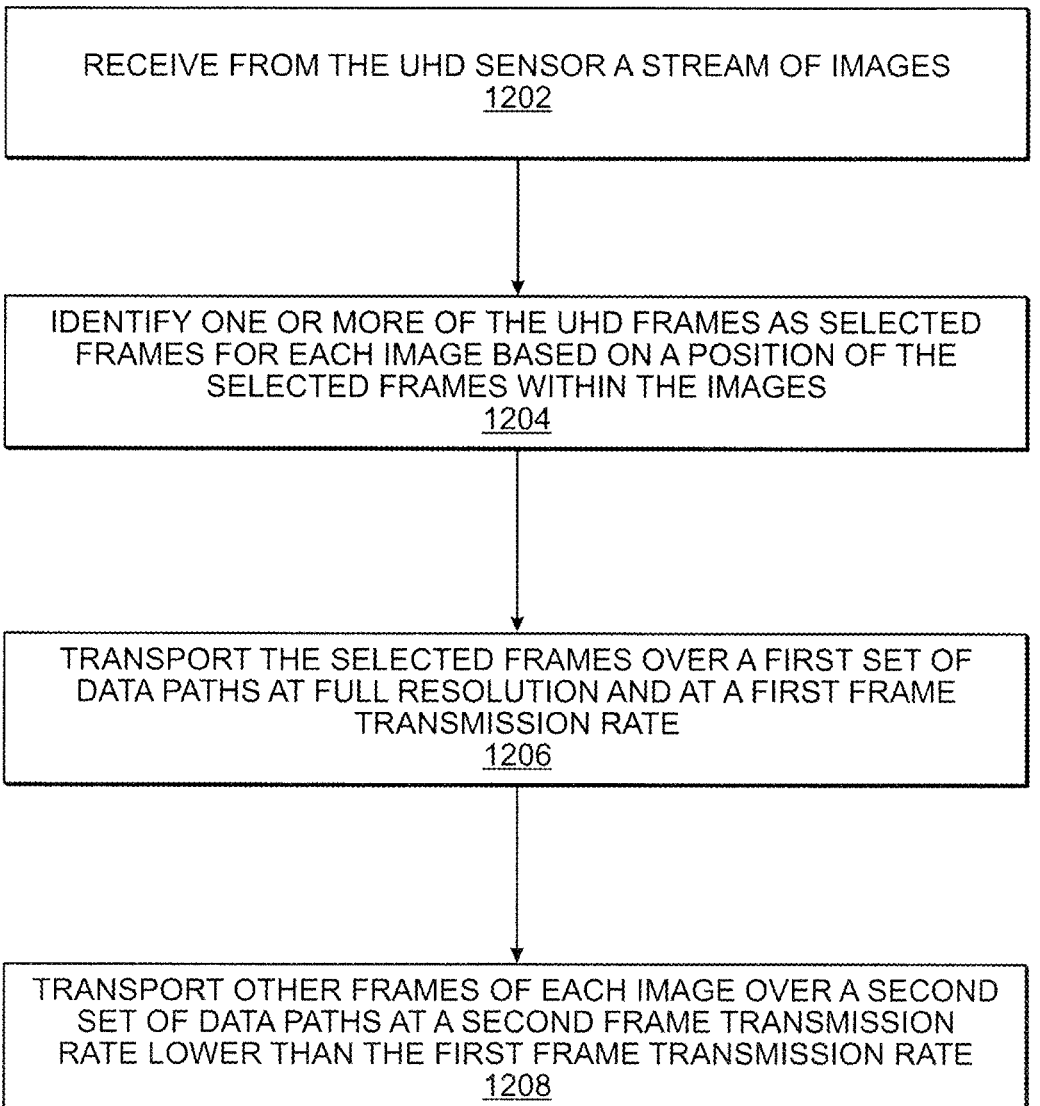

RECEIVE FROM THE UHD SENSOR A STREAM OF IMAGES
1202

IDENTIFY ONE OR MORE OF THE UHD FRAMES AS SELECTED
FRAMES FOR EACH IMAGE BASED ON A POSITION OF THE
SELECTED FRAMES WITHIN THE IMAGES
1204

TRANSPORT THE SELECTED FRAMES OVER A FIRST SET OF
DATA PATHS AT FULL RESOLUTION AND AT A FIRST FRAME
TRANSMISSION RATE
1206

TRANSPORT OTHER FRAMES OF EACH IMAGE OVER A SECOND
SET OF DATA PATHS AT A SECOND FRAME TRANSMISSION
RATE LOWER THAN THE FIRST FRAME TRANSMISSION RATE
1208

FIG. 12

TRANSPORTING ULTRA-HIGH DEFINITION VIDEO FROM MULTIPLE SOURCES

CROSS-REFERENCE TO RELATED APPLICATIONS

This application is a division of U.S. patent application Ser. No. 17/336,826, filed Jun. 2, 2021, which application is a continuation of U.S. patent application Ser. No. 15/455, 726, filed Mar. 10, 2017, the entire contents of each of which are incorporated by reference herein for all purposes.

FIELD OF TECHNOLOGY

The present disclosure is in the field of image processing architectures and more particularly in the field of ultra-high definition video processing.

BACKGROUND

Ultra-high definition (UHD) image sensors, which have a large image format and small pixel pitch, are becoming commonly available for use in numerous new products and applications. However, conventional video architectures generally do not support bandwidth and timing requirements of UHD sensors. New video architectures that support the bandwidth and timing requirements of UHD sensors have been developed; however, these new video architectures are generally developed from scratch for particular uses without taking advantage of previously available hardware.

Improvements in UHD sensor technologies vastly exceed bandwidth and transport capabilities of many existing video transport architectures. An extensive infrastructure of existing video hardware that is designed and configured for transporting high definition (HD) video is deployed and installed in equipment throughout the world. This infrastructure generally does not support transport of video data from the UHD video image sensors to a display or end-user.

Existing HD video architectures are generally configured for processing streams of video data that conform to one or more standard formats such as the Society of Motion Picture and Television Engineers (SMPTE) standards SMPTE 292M and SMPTE 424M, for example. These standards include a 720p high definition (HDTV) format, in which video data is formatted in frames having 720 horizontal data paths and an aspect ratio of 16:9. The SMPTE 292M standard includes a 720p format which has a resolution of 1280×720 pixels, for example.

A common transmission format for HD video data is 720p60, in which the video data in 720p format is transmitted at 60 frames per second. The SMPTE 424M standard includes a 1080p60 transmission format in which data in 1080p format is transmitted at 60 frames per second. The video data in 1080p format is sometimes referred to as "full HD" and has a resolution of 1920×1080 pixels.

A large number of currently deployed image detection systems are built in conformance with HD video standards, such as the commonly used 720p standard. The 1280×720 pixel frames of a 720p standard system include about 1.5 megapixels per frame. In contrast, UHD image sensors generally output image frames in 5 k×5 k format, which have about 25 million pixels per frame. Therefore, the 1280×720 pixels used in a 720p standard system are not nearly enough to transport the much larger number of pixels generated by an UHD image sensor.

UHD sensors are conventionally used with video architectures that are designed particularly for transporting UHD video data. These new video architectures generally leverage video compression techniques to support UHD bandwidth and timing requirements. Some video architectures that are currently used for transporting UHD video data use parallel encoders or codecs and data compression to transport the UHD video. However, the use of compression makes these video architectures unsuitable for end users who rely on receiving raw sensor data.

The use of legacy hardware for transporting UHD video from next generation image sensors is problematic because the legacy hardware generally does not provide sufficient bandwidth. Moreover, replacing existing video architectures with new architectures for transporting UHD video data can be impractical and/or prohibitively expensive for users who have already implemented a large amount of conventional video processing equipment.

Various spatial and temporal video compression techniques have been used to process image data from UHD image sensors for transport over existing HD video architectures. The UHD video data is commonly compressed using compression algorithms that retain enough of the UHD video data to generate visible images and video streams for human viewing, but lose or discard data from the UHD image sensors that may not be needed for human viewable images and video streams.

However, in some image processing applications, it is desirable to extract, analyze and/or store raw image sensor data that may not be perceptible by human viewers. This additional information in the raw image sensor data may be extracted and processed by computers and processing circuitry, for example. Compression algorithms that lose or discard some of the image data output from the image sensors are unsuitable for these applications.

Other conventional techniques for processing data from UHD sensors generally involve the use of new or proprietary video architectures that have been developed for particular applications of the UHD sensors. These techniques are costly and inefficient because they do not take advantage of widely available HD video architectures that have been deployed throughout the world.

SUMMARY

Aspects of the present disclosure include a UHD sensor data processing apparatus and method for efficient and lossless collection and of UHD data. A sensor data processing apparatus according to an aspect of the present disclosure includes a raw UHD data input path coupled to processing circuitry and a plurality of image data output paths coupled in parallel to the processing circuitry. One or more metadata output paths are coupled to the processing circuitry in parallel with the image data output paths.

The processing circuitry is configured to receive the raw UHD data from a UHD sensor, divide the raw UHD data into lossless segments and direct the lossless segments in parallel onto the image data output paths. The processor circuitry is also configured to generate metadata including encoded information that facilitates reconstruction of the raw UHD data from the lossless segments, and direct the metadata onto the metadata output paths.

According to aspects of the present disclosure, improved methods and apparatus for transporting video data from UHD sensors to a display or to an end-user via the current video transport architectures include pixel packing methods and methods of using multiple physical connections to transmit data in parallel. The methods disclosed herein overcome bandwidth limitations of legacy hardware and enable legacy hardware to transport UHD video data from next generation image sensors.

Aspects of the present disclosure also includes a method for scaling a number of physical data channels to accommodate optimal usage of available resources and a method for dynamic unpacking of the UHD video data from multiple SMPTE 424 HD feeds. According to an aspect of the present disclosure, the unpacked data can be reassembled into HD images for display and visualization in real time.

BRIEF DESCRIPTION OF THE DRAWINGS

The above and other features of the present inventive concept will become more apparent by describing in detail exemplary embodiments thereof with reference to the accompanying drawings, in which:

FIG. 9 is a process flow diagram showing a method for transporting video data according to an aspect of the present disclosure.

FIG. 12 is a process flow diagram showing a method of transporting video data from a UHD image sensor according to an aspect of the present disclosure.

DETAILED DESCRIPTION

Figure 1:
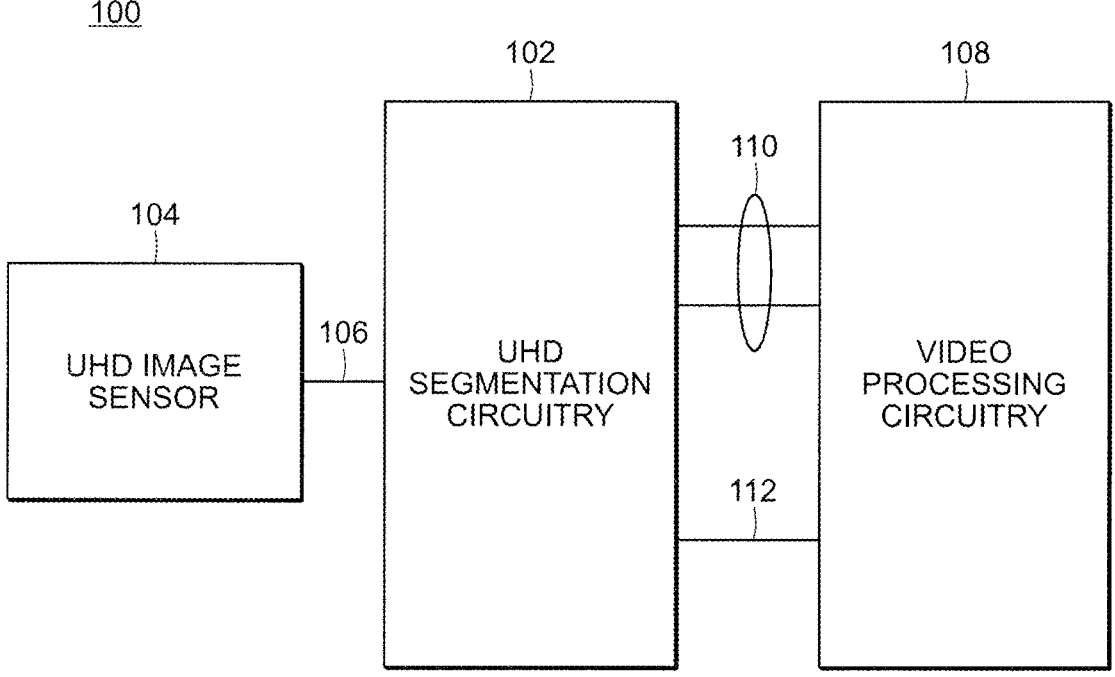
FIG. 1 is a diagram of a UHD sensor data processing system according to an aspect of the present disclosure.

Aspects of the present disclosure include a system and method for lossless communication and processing of UHD video data from one or more UHD image sensors using existing HD video architectures. Processing of UHD video data using currently available video architectures, according to aspects of the present disclosure involves breaking up UHD video data from one or more UHD sensors into manageable segments. The segments are combined and spread into multiple channels of HD video. In an illustrative embodiment, the UHD video data may be provided from a UHD sensor in 5K×5K frames at 30 Hz, which are broken down into 720p60 segments. In the illustrative embodiment, the segments are combined into multiple channels of SMPTE424M 1080p60 video.

Some commonly used UHD image sensors generate image frames having 5120×5120 pixels per frame. However, according to aspects of the present disclosure, "UHD sensor" can refer to a number of different types of image sensors generating different frame sizes and pixel sizes. For example, some UHD image sensors generate image frames having 4K×4K pixels, and may have 12 bits per pixel, or 10 bits per pixel. The term "UHD sensor" as used herein is not limited to a particular type of sensor or a particular frame size or pixel size.

According to another aspect of the present disclosure, the multiple SMPTE feeds are reconstructed into a single UHD video feed based on metadata that describes how the segments were generated from the UHD sensor data.

An illustrative embodiment of the disclosed UHD video processing system and method uses multiple 720p video frame buffers to break apart and encode large format video from one or more UHD image sensors. Image data from the UHD image sensors is spread across a multi-channel 720p HD video architecture. A robust encoding scheme generates metadata that describes how the portions of raw image data are distributed over the multiple channels and enables lossless reconstruction of the original UHD video data.

An illustrative embodiment of a UHD sensor data processing system according to an aspect of the present disclosure is described with reference to FIG. 1. The system 100 includes UHD segmentation circuitry 102 coupled to a UHD image sensor 104 via a raw UHD data input path 106. In the illustrative embodiment, the system 100 also includes video processing circuitry 108 coupled to the UHD segmentation circuitry 102 via a number of image data output paths 110 and one or more metadata paths 112. The data output paths 110 and the metadata paths 112 may coexist on the same conductive pathway or may be alternatively be configured on separate conductive pathways.

In the illustrative embodiment the UHD segmentation circuitry 102 includes memory circuitry coupled to processor circuitry. The processor circuitry is configured to receive raw UHD data from the UHD image sensor 104, divide the raw UHD data into lossless segments and direct the lossless segments in parallel onto the image data output paths 110. In the illustrative embodiment, the processor circuitry is also configured to generate metadata including encoded information that facilitates reconstruction of the raw UHD data from the lossless segments, and to direct the metadata onto the metadata output paths 112.

A method for processing UHD sensor data according to an aspect of the present disclosure is described with reference to FIG. 2. The method 200 includes receiving raw UHD data from a UHD sensor, such as a UHD image sensor 104 of FIG. 1, at block 202 and dividing the raw UHD data into lossless segments at block 204. In an illustrative embodiment the raw UHD data is divided by UHD segmentation circuitry 102, of FIG. 1 which may include a series of FPGA and processing systems, for example. In the illustrative embodiment the UHD segmentation circuitry 102 of FIG. 1 includes digital video processor (DVP) circuitry that receives the video from the UHD image sensor 104 and divides it up into multiple 720p images. The method 200 also includes directing the lossless segments in parallel onto a number of image data output paths, such as the image data output paths 110 of FIG. 1 at block. 206. This may also be performed by a series of FPGA and processing systems in the UHD segmentation circuitry 102. The method also includes generating metadata including encoded information that facilitates reconstruction of the raw UHD data from the lossless segments, at block 208, and directing the metadata onto one or more metadata output paths, such as metadata output paths 112 of FIG. 1, in parallel with the image data output paths 110 at block 210.

In an illustrative embodiment, the UHD segmentation circuitry 102 of FIG. 1 includes SMPTE video processor (SVP) circuitry that receives the 720p images from the DVP, circuitry, divides them into appropriately formatted SMPTE 1080p video frames, and adds appropriately formatted SMPTE metadata to ancillary video space. The metadata includes packing details, such as pixel location of start of frame and end of frame, frame rate, bit depth, bit packing mode, etc. The same metadata space has provisions for giving line of sight, or pointing information indicating where the UHD image sensor 104 was pointed for each applicable frame so that this information can be used to add context to the UHD video frame captured by the UHD image sensor 104.

Another illustrative embodiment of an image data processing system according to an aspect of the present disclosure is described with reference to FIG. 3. In the illustrative embodiment, the system 300 includes a UHD image sensor 302 coupled to UHD segmentation circuitry 304. The UHD image sensor 302 is an exemplary implementation of the UHD image sensor 104 shown in FIG. 1. The UHD segmentation circuitry 304 is an exemplary implementation of the UHD segmentation circuitry 102 shown in FIG. 1.

The UHD image sensor 302 generates image frames having a 5 k×5 k pixel format. In this illustrative embodiment, two 720p compatible HD image sensors 306, 308 are also coupled to the UHD segmentation circuitry 304. A first one of the 720p compatible image sensors is a medium wave infrared image sensor 306 that generates image frames having a 1280×720 format. A second one of the 720 compatible image sensors is a short wave infrared image sensor 308 that generates image frames having a 1280×720 format.

In the illustrative embodiment, the system 300 is configured to transfer data in compliance with SMPTE standards such as the SMPTE424M standard, for example.

In the illustrative embodiment, the UHD segmentation circuitry 304 includes a video architecture turret 310 coupled to the UHD image sensor 302 and to the 720p compatible HD image sensors 306, 308 via a high speed image sensor interface. The UHD segmentation circuitry 304 also includes a SMPTE video processor 312 coupled to the video architecture turret 310 via a parallel pass through interface such as a slip ring interface 314.

The video architecture turret 310 packs and spreads the UHD image data from the UHD image sensor 302 across six of eight standard 720p parallel output channels as 720p60 Hz video, for example. The video architecture turret 310 also transfers the standard 720p image data from each of the 720p compatible image sensors 306, 308 on the respective remaining two of the eight standard 720p parallel output channels as 720p60 Hz video.

The SMPTE video processor 312 receives the eight parallel input channels from the video architecture turret 310 and inserts KLV (Key-Length-Value) metadata using a vertical ancillary (VANC) technique with packing and spreading information to facilitate unpacking and reconstruction of the UHD image data. Persons skilled in the art should recognize that VANC is a conventional technique for embedding non-video information in a video signal. For example, the metadata includes packing details, such as pixel location (row, column) of start of frame and end of frame, frame rate (30, 60), bit depth (8, 10, 12, 16), and bit packing mode (two bytes per pixel, one byte per pixel, etc.), for example. The same metadata space has provisions for giving line of sight (inertial measurement unit (IMU), gyro, accelerometers, resolvers, servo state, encoder feedback, focus information, temperatures of the system optics, etc.) and/or pointing information indicating where the UHD image sensor 302 was pointed for each applicable frame acquired by the UHD image sensor 302. The information in the metadata can be used to add context to the UHD video frame captured by the UHD image sensor 302. The SMPTE video processor 312 also inserts a unique identifier for each image frame.

In the illustrative embodiment, back-end processor circuitry 316 is coupled to the UHD segmentation circuitry 304 to receive the spread and packed UHD image data from the video architecture turret 310 along with the KLV metadata from the SMPTE video processor 312. The back end processing circuitry 316 is an exemplary implementation of the video processing circuitry 108 shown in FIG. 1 and includes a number of outputs. For example, outputs of the back end processing circuitry 316 could be compressed/processed video to display on a standard video display, or could be track data showing tracks of moving objects, etc. The back-end processor circuitry 316 reads the KLV metadata and performs lossless reconstruction of the UHD image data from the UHD image sensor 302 to generate and buffer full frames of UHD video. The back-end processor circuitry 316 may also be configured to identify targets and create tracking information from the buffered UHD video, for example.

Figure 3:
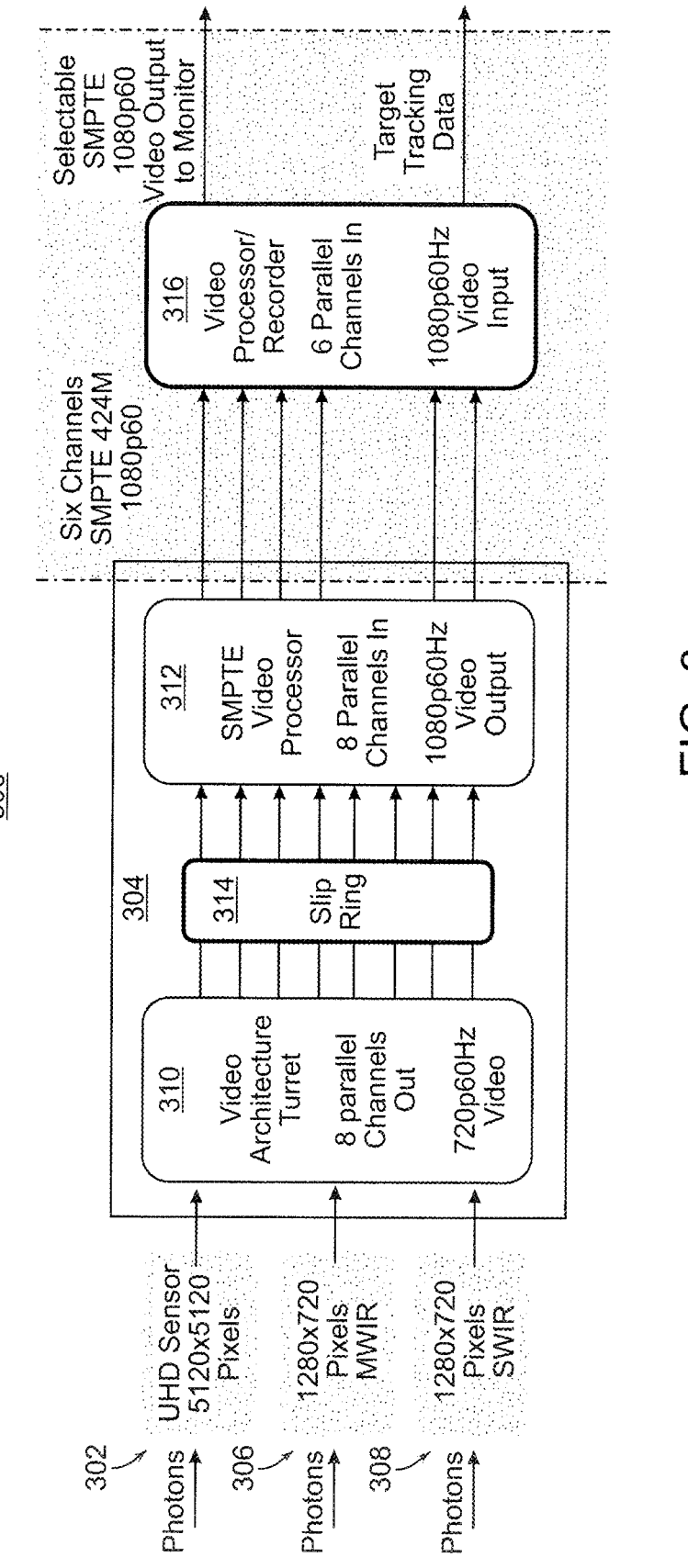
FIG. 3 is a diagram of an illustrative embodiment of a UHD sensor data processing system.
Figure 4:
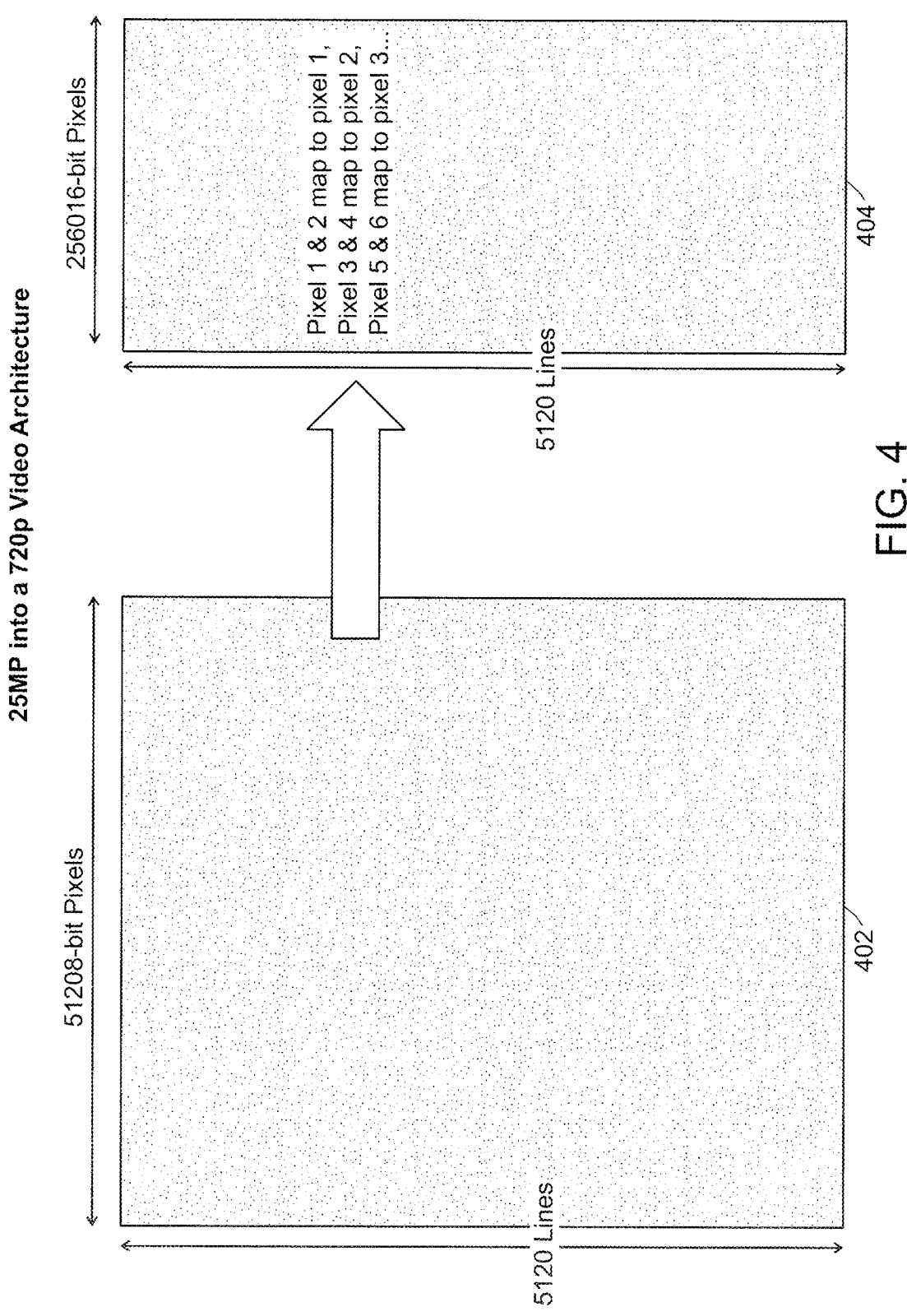
FIG. 4 is a diagram of a UHD image frame in 8 bit pixel format being packed into an image frame having 16 bit pixel format according to an aspect of the present disclosure.

Referring to FIG. 4, in an illustrative embodiment a UHD image frame 402 in a 5120×5120 8 bit pixel format is packed into 5120×2560 16 bit pixel frames 404 by mapping data from every two 8 bit pixels in each of the UHD image frames 402 into a single 16 bit pixel of a corresponding 5120×2560 16 bit pixel frame 404. This may be performed, for example, by the video architecture turret 310 of FIG. 3 to reduce the bandwidth required across the slip ring interface 314 of FIG. 3, by utilizing the existing 16 bit pixel video architecture. This effectively cuts the bandwidth need by half. Alternatively, this packing may be performed by the SMPTE video processor 312. However, packaging the pixels by the video architecture turret 310 prior to the slip ring interface 314 helps to mitigate data bottlenecks that may occur at the slip ring interface 314 prior to the SMPTE video processor 312.

Figure 2:
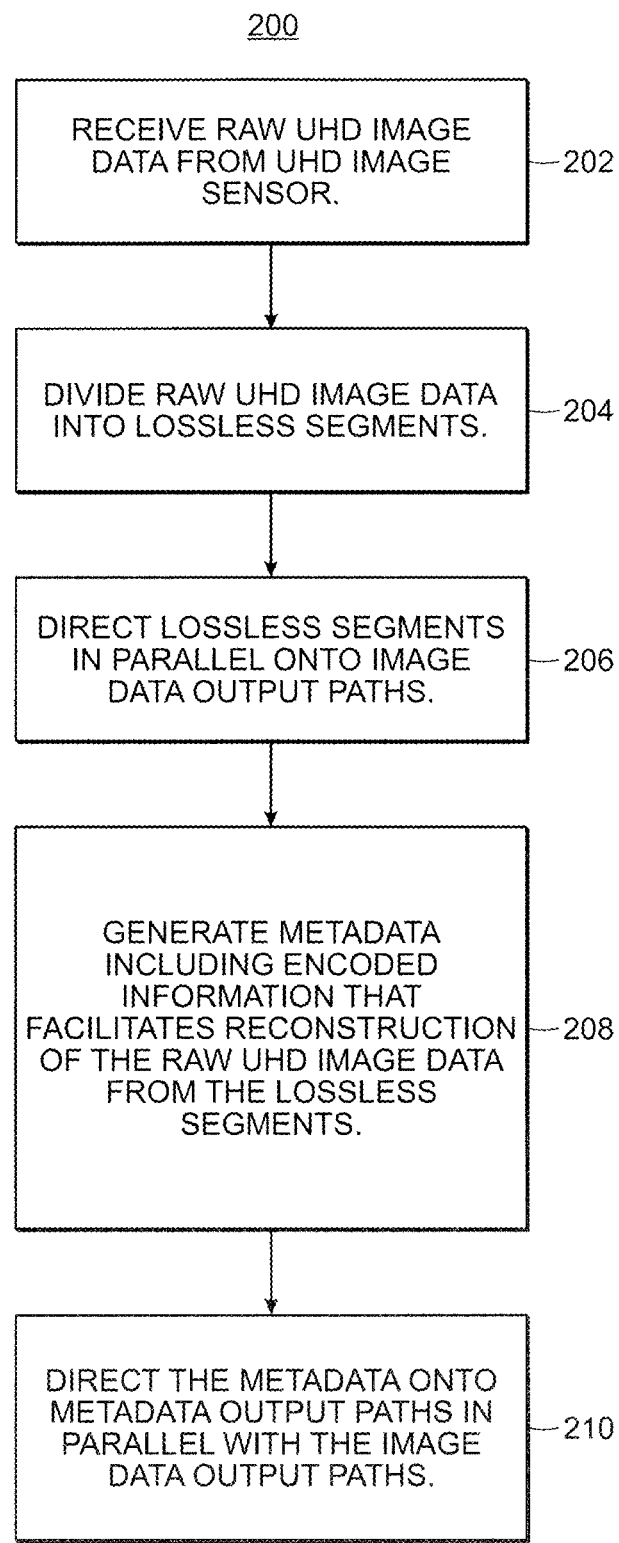
FIG. 2 is a process flow diagram showing a method for processing UHD sensor data according to an aspect of the present disclosure.
Figure 5:
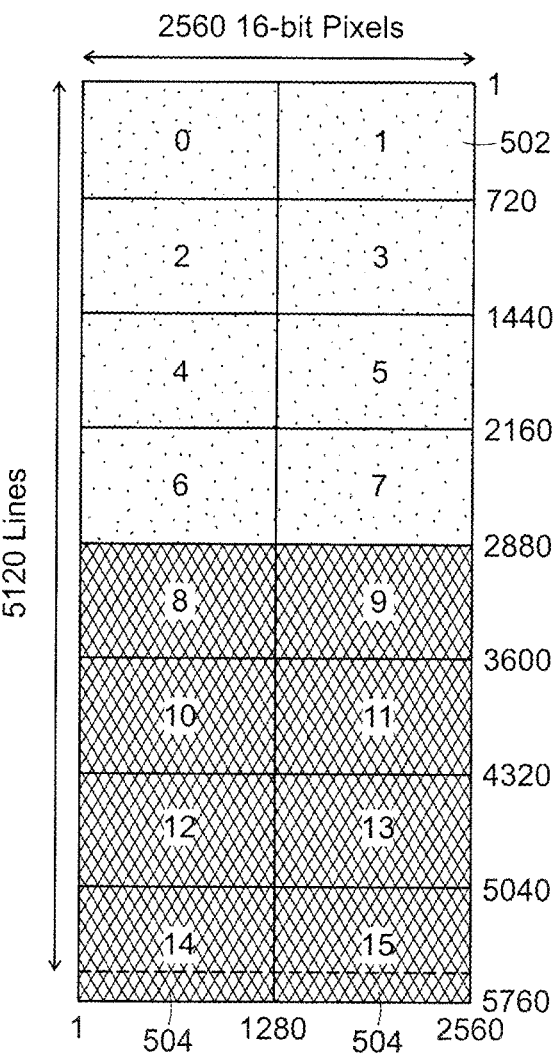
FIG. 5 is a diagram of a UHD image data segmented into 1280×720 pixel frames according to an aspect of the present disclosure.

Referring to FIG. 5, in the illustrative embodiment, each 25 mega-pixels of raw image data contained in the 5120× 5120 image frames is divided into lossless segments as described at block 204 of FIG. 2. The 5120×5120 frames are converted for compatibility with a 720 video architecture by dividing the 5120×5210 frames at 8-bits per image into 1280×720 frames with 16 bits per pixel. This results in sixteen 1280×720 frames 502 with 16 bit pixels. According to an aspect of the present disclosure, frames 0-7 are transported by the video architecture turret 310 across the slip ring 314 to the SMPTE video processor 312 (each shown in FIG. 3) in parallel on a first 60 Hz clock cycle, and frames 8-15 are transported across the slip ring interface 314 in parallel on the second 60 Hz clock cycle. Each eight frames of the 1280×720 60 Hz frames 502 are stored in a SMPTE video processor frame memory which is included in the SMPTE video processor 312. In this illustrative embodiment the SMPTE video processor frame memory has excess memory space 504 that can be used for additional data transfer as applicable, every 30 Hz cycle, for example. The KLV metadata is then updated by the SMPTE video processor 312 with applicable packing and spreading information such as pixel location (row, column) of start of frame and end of frame, frame rate (30 Hz, 60 Hz), bit depth (8, 10, 12, 16), and bit packing mode (two bytes per pixel, one byte per pixel, etc.), for example. Unique frame identification (ID), precision timestamp (seconds, fractional seconds all correlated to UTC time) reception of photons on the image sensor, etc. The same metadata space has provisions for giving line of sight (IMU, gyro, accelerometers, resolvers, servo state, encoder feedback, focus information, temperatures of the system optics, etc.) or pointing information of where the UHD image sensor 302 was pointed for each applicable frame, so that this information can be used to add context to the UHD video frame captured by the UHD image sensor 302. The metadata also includes a unique identifier for each frame to generate and output four channels of 1920×1080 60 Hz frames with 20 bit per pixel in SMPTE242M video including the KLV metadata.

The amount of memory space 504 can be observed by considering that the eight parallel 720p channels of 1280× 720 frames use about 7.37 million pixels. Because the 720p frames are running at 60 frames per second or 16.667 milliseconds per frame, which is twice as fast as the UHD sensor, the 7.37 million pixels are doubled resulting in about 14.75 million pixels. The 5120×5120 pixel UHD sensor (303, FIG. 3) runs at 30 frames per second or 33.333 milliseconds per frame. Because two 8-bit pixels are packed into each 720p 16-bit pixel, each frame is reduced to an effective 2560×5120 pixel size. This results in about 13.1 million pixels per UHD frame. For every 30 Hz UHD frame (33.333 ms) there are 16 720p frames available to pack UHD sensor data. Therefore, about 14.75 million pixels are available in which to pack about 13.1 million UHD pixels every 33.33 ms or at a 30 Hz rate. In this illustrative embodiment, the excess memory space 504 available in every 30 Hz UHD frame is the difference between 14.75 million and 13.1 million which equals about 1.65 million pixels.

Reassembly and loss of video data in real time for visualization becomes problematic using existing compression techniques. Many existing commercially available architectures for transporting UHD video data employ temporal compression, which destroys metadata accuracy and integrity, destroys alignment of the metadata to video frames, reduces resolution and/or adds undesired latencies. Many techniques for transporting UHD video data are optimized to preserve frame rate and maintain visual appeal of displayed video. These types of architectures are unsuitable for transporting UHD video data in many applications such as surveillance wherein data accuracy and integrity of all metadata is more important than frame rate. In these applications it is important to reconstruct raw video data from the UHD video image sensor.

Aspects of the present disclosure use existing HD video architectures to encode variable pixel count source data across multiple video channels using KLV metadata. The variable pixel count source data may include 2 MP source data and 25 MP source data, for example.

Figure 6:
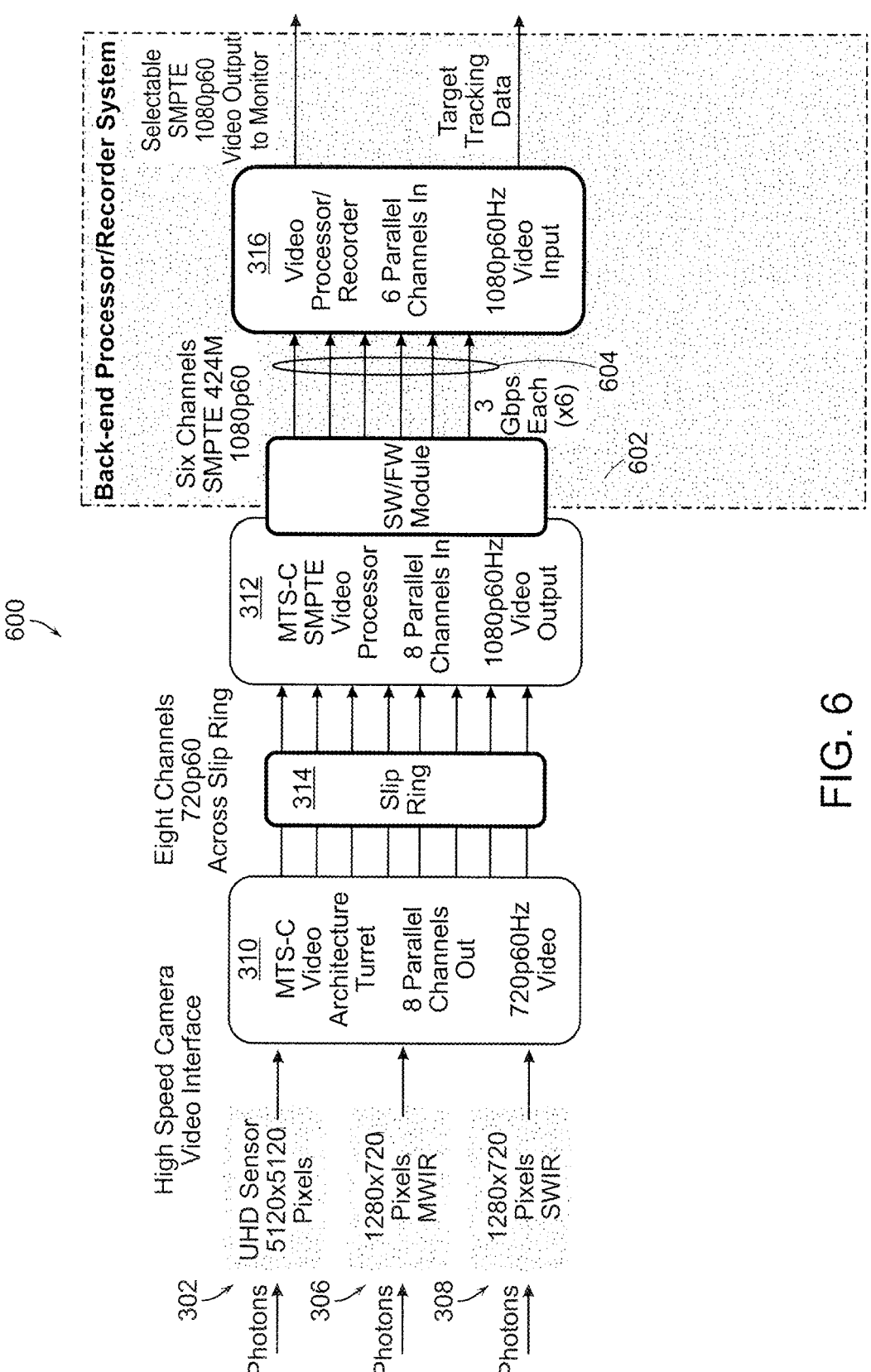
FIG. 6 is a diagram of an illustrative embodiment of a UHD sensor data processing system including a bandwidth monitor module according to an aspect of the present disclosure.

A sensor data processing apparatus 600 including an SMPTE physical layer manager that performs dynamic scaling, unpacking and assembling UHD video using multiple SMPTE 424M feeds according to an aspect of the present disclosure is described with reference to FIG. 6.

In an illustrative embodiment, an SMPTE physical layer manager includes a bandwidth monitor module 602 coupled to a number of physical data paths 604 between the SMPTE video processor 312 and back end processor 316, which were described above with reference to FIG. 3. The band-width monitor module 602 is configured to monitor, measure and/or manage available bandwidth on the physical data paths 604 that are output from the video processor 312. The bandwidth monitor module 602 is also configured to perform dynamic video spreading that optimizes utilization of available bandwidth.

According to aspects of the present disclosure, the dynamic video spreading breaks up large images and spreads them across a series of 3 Gbps SMPTE standard physical data paths 604. In an illustrative embodiment, the physical data paths 604 comprise six SMPTE 424M 1080p60 channels. According to another aspect of the present disclosure the bandwidth monitor module 602 uses KLV metadata and user defined fields to communicate with the dynamic video spreading function, and ensures that the metadata is time aligned with the applicable video.

In an illustrative embodiment, the sensor data processing apparatus 600 includes processing circuitry, a raw UHD video data input path coupled to the processing circuitry, and a number of image data output paths coupled in parallel to the processing circuitry. The sensor data processing apparatus 600 also includes one or more metadata output paths coupled to the processing circuitry in parallel with the image data output paths, and a bandwidth monitor module 602 coupled to the image data output paths. The bandwidth monitor module 602 is configured to determine a frame size output by each image sensor 302, 306, 308 coupled to a number of physical data paths in the sensor data processing apparatus 600 and compute a first frame transmission rate that allows transmission of full resolution images from the image sensors 302, 306, 308 over the physical data paths based on the respective frame size output by each of the image sensors 302, 306, 308. The bandwidth monitor module 602 is also configured to throttle a data transport rate on the plurality of physical data paths to the first frame transmission rate.

In an illustrative embodiment, the bandwidth monitor module 602 is configured to communicate with the video architecture turret 310 of FIG. 3 to optimize video the spreading to utilize available bandwidth. The bandwidth monitor module 602 may use KLV metadata and user defined fields to communicate with the video architecture turret, for example. The bandwidth monitor is also configured to ensure that the metadata is time aligned with corresponding video data in the UHD data.

According to another aspect of the present disclosure, the bandwidth monitor module 602 is configured to dynamically determine how many physical data paths are needed to transport the video data at full resolution and a first frame transmission rate.

The bandwidth monitor module 602 determines a quantity of physical data paths that is sufficient to transport images from the connected sensors at full resolution and at the first frame transmission rate based on the number, types and modes of the connected sensors. The first frame transmission rate may be a real-time or nearly real-time transmission rate, for example. The bandwidth monitor module 602 reduces the frame transmission rate to a second frame transmission rate when the quantity of physical data paths that is sufficient for full resolution at the first frame transmission rate is greater than the number of physical data paths coupled to the sensors. The second frame transmission rate is computed to allow transmission of frames over the physical data paths at full resolution from the sensors to a display or end user, for example.

The bandwidth monitor module 602 may be configured to determine a respective type and output mode for each of the image sensors, and determine the frame size output for each of the image sensors based on their respective type and output mode.

Figure 7:
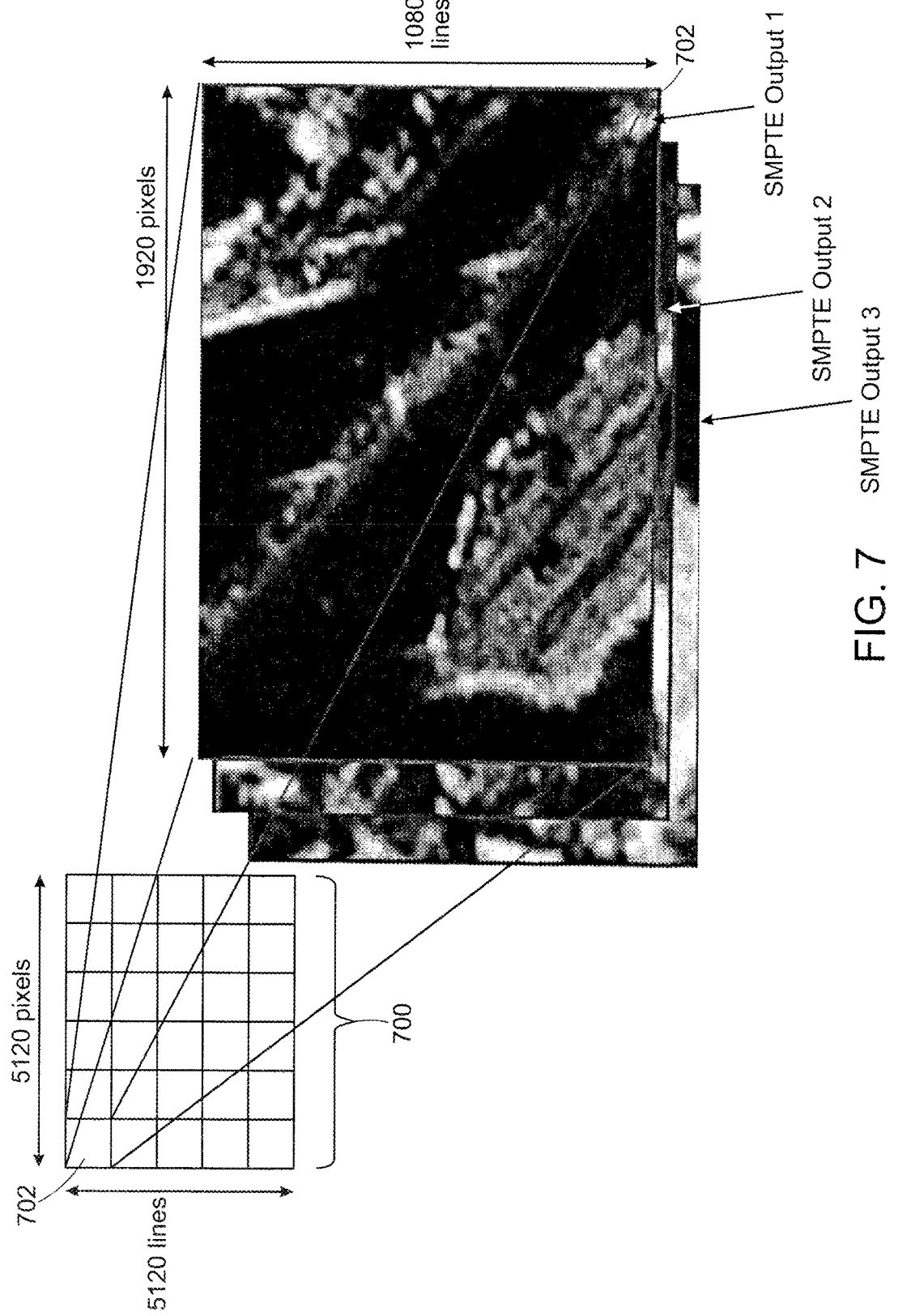
FIG. 7 is diagram of multiple frames of an image associated with metadata for reconstructing the image according to an aspect of the present disclosure.

FIG. 7 shows an example use of KVL metadata in an illustrative embodiment. In the illustrative embodiment, an image 700 having 5120 pixels×5120 lines is broken up into a number of 1920×1080p 60 Hz frames 702. Each of the 1920×1080p 60 Hz frames 702 contains a chip of a larger image 700. According to an aspect of the present disclosure, KLV metadata is associated with each of the frames 702. The KVL metadata contains data indicating where the chip is to be located when it is reassembled in the larger image. According to an aspect of the present disclosure, the KLV metadata also contains geo-location information such as line of sight (LOS) information and global positioning system) GPS information that can be used for stitching edges of adjacent frames together to generate mosaics or panoramic images without overlapping pixels.

Figure 8:
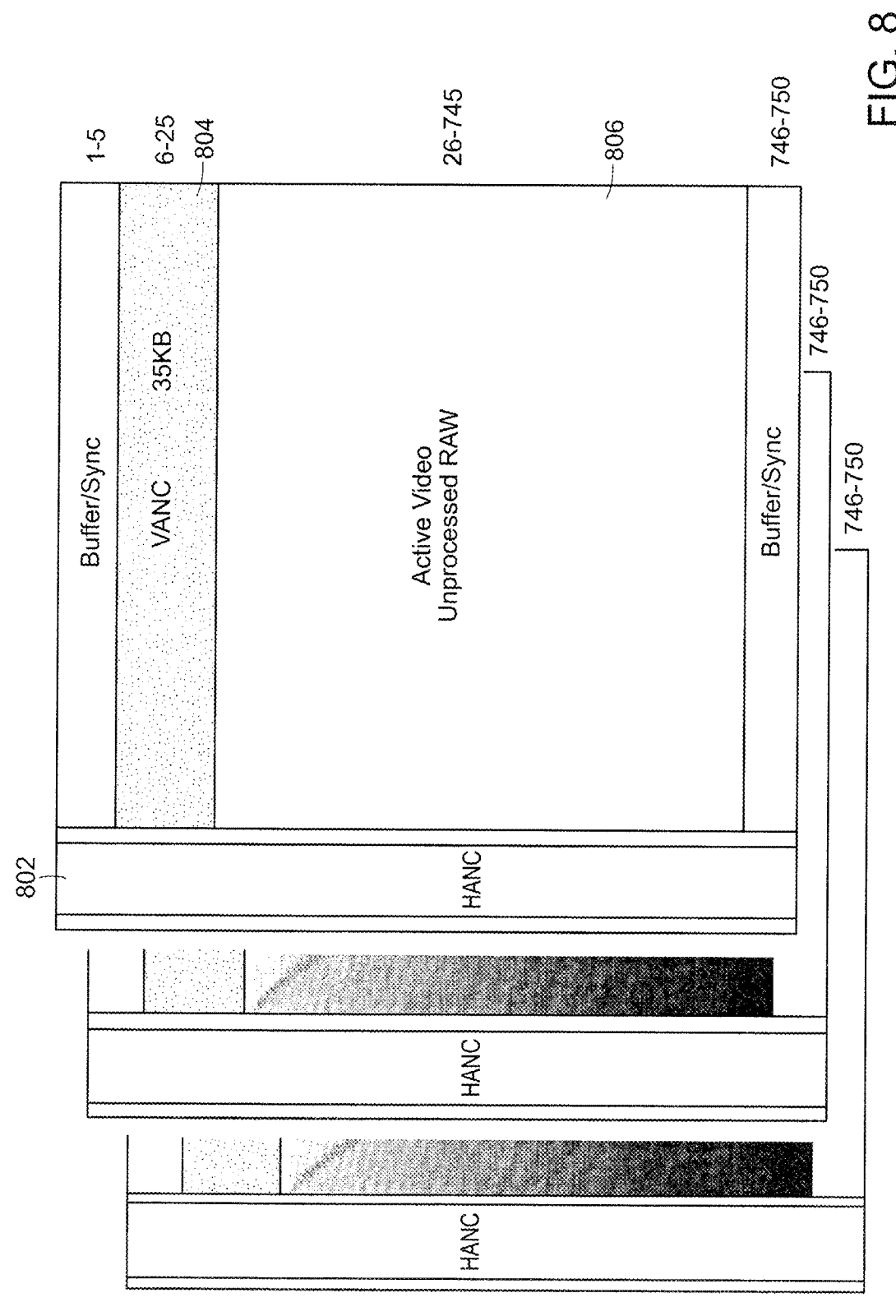
FIG. 8 is diagram of a video stream each include metadata space for storing and transporting metadata according to aspects of the present disclosure.

Referring to FIG. 8, parallel video streams each include their own horizontal ancillary (HANC) metadata space 802 and VANC metadata space 804. According to an aspect of the present disclosure, unique time aligned packing and spreading information is included in each VANC metadata space 804 for each frame 806. Encoded information in each VANC metadata space 804 may include unique frame identifiers such as time zone correlated time stamps; start and/or stop pixel location of image(s); line length and number of data paths of the image(s) contained in the frame; pixel packing information; and frame rate information, for example. According to an aspect of the present disclosure, the VANC may also include line of sight (LOS) and pointing information, and/or global positioning system information that precisely indicates a location of the airframe or other sensor platform, for example.

A method for transporting video data according to an aspect of the present disclosure is described with reference to FIG. 9. At block 902, method 900 includes determining a frame size output by each image sensor 302, 306, 308 of FIG. 3 coupled to a number of physical data paths in a video data transport apparatus such as system 300 in FIG. 3 at block 902. At block 904, the method 900 includes computing a first frame transmission rate that allows transmission of full resolution images from the image sensors 300, 306, 308 over the physical data paths based on the respective frame size output by each of the image sensors 300, 306, 308. At block 906, the method 900 includes throttling a data transport rate on the plurality of physical data paths to the first frame transmission rate.

In an illustrative embodiment, the method 900 also includes dynamically determining how many physical data paths are needed to transport the video data at full resolution and a first transmission rate that is a real-time or nearly real-time frame transmission rate.

In another illustrative embodiment, the method 900 may also include determining a quantity of physical data paths that is sufficient to transport images from the connected sensors at full resolution and at the first transmission rate, based on the number, types and modes of the connected sensors. When the quantity of physical data paths that is sufficient for full resolution at the first frame transmission rate is greater than the number of physical data paths coupled to the sensors, the frame transmission rate is reduced to a second frame transmission rate. The second frame transmission rate is computed to allow transmission of frames over the physical data paths at full resolution from the sensors to a display or end user, for example.

The method 900 may also include steps of determining a respective type and output mode for each of the image sensors, and determining the frame size output for each of the image sensors based on their respective type and output mode.

In an illustrative embodiment, the method 900 may include steps of dynamically determining a number of the physical data paths that are coupled to the sensors, and computing the first frame transmission rate based on the respective frame size output by each of the image sensors and based on the number of physical data paths coupled to the sensors. The number of the physical data paths that are coupled to the sensors may be determined by sensing the number of the physical data paths that are transporting data, for example.

The method 900 may also include determining the type and mode of the sensors connected to the plurality of data paths based on setup configuration information input by a user during setup. The configuration may be stored in a nonvolatile data storage apparatus, for example.

In another illustrative embodiment, determining the type and mode of the sensors connected to the plurality of data paths may be performed by reading sensor identification information on the signal data paths at power up. This embodiment would not require a nonvolatile data storage apparatus for storing configuration information.

In another illustrative embodiment, determining the type and mode of the sensors connected to the plurality of data paths may be performed by buffering a frame from each of the connected sensors in a frame buffer and determining the frame size by determining the amount of data or size of pixels in the data in the frame buffer, for example.

According to another aspect of the present disclosure, Embedded UHD Adaptive Bitrate Streaming of video data is performed using Multiple SMPTE 424M Connections.

Figure 10:
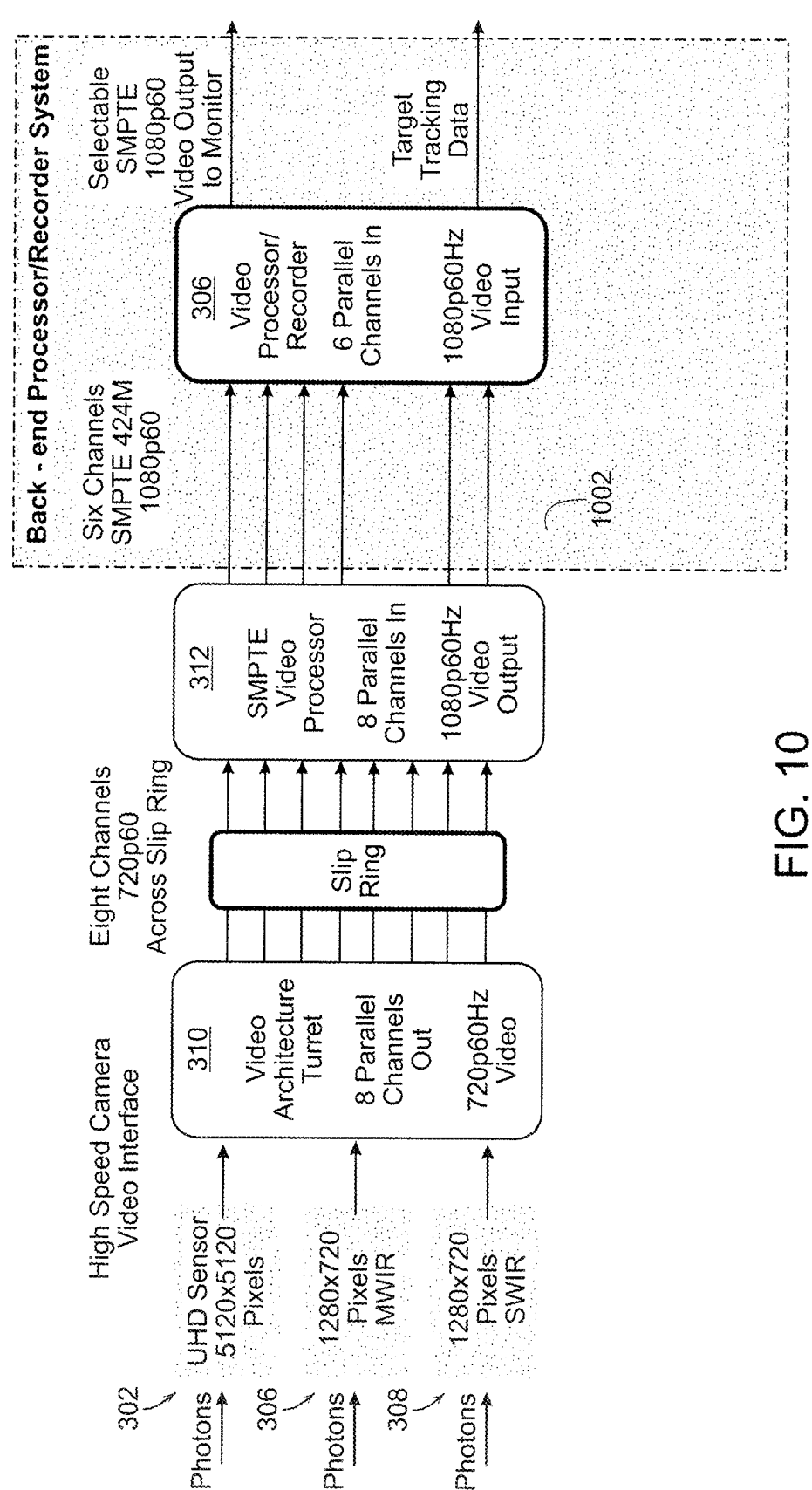
FIG. 10 is a diagram of an illustrative embodiment of a UHD sensor data processing system including a throttle module for dynamically adapting bit rates of video data being transported according to an aspect of the present disclosure.

Referring to FIG. 10, a bit rate streaming or frame per second (FPS) throttle (throttle module) 1002 is configured to detect multiple SMPTE connections between SMPTE video processor 312 and video processor 316. When multiple SMPTE connections are detected, the throttle module 1002 sends data from the multiple SMPTE connections along parallel channels. In an illustrative embodiment, the throttle module 1002 is used in conjunction with existing algorithms to dynamically adapt bit rates of the video to achieve a balance between latency and resolution without loss of video data.

According to an aspect of the present disclosure, the throttle module 1002 first detects the number of physical connections between SMPTE video processor 312 and video processor 316. The throttle module 1002 may be configured to select compression techniques and data paths based on the number of physical connections between SMPTE video processor 312 and video processor 316. The compression techniques and data paths may be selected based on configurable parameters for compression options and/or predetermined timing constraints that may be programmed in software or firmware of the throttle module 1002, for example. In an illustrative embodiment, additional pixel packing can be performed to maximize use of the SMPTE pixel space that is defined according to SMPTE standards.

According to another aspect of the present disclosure, the throttle module 1002 may be configured to identify user-defined critical regions of an image and transport data corresponding to the critical regions between SMPTE video processor 312 and video processor 316 at a higher rate than data is transferred for other areas of the image. In an illustrative embodiment, critical regions may be identified based on user input wherein the throttle module is in communication with a user interface to receive parameters defining the critical region from a user, for example. In an alternative embodiment, the throttle module may be configured to identify a predetermined area of each frame, such as a center area, for example.

Figure 11:
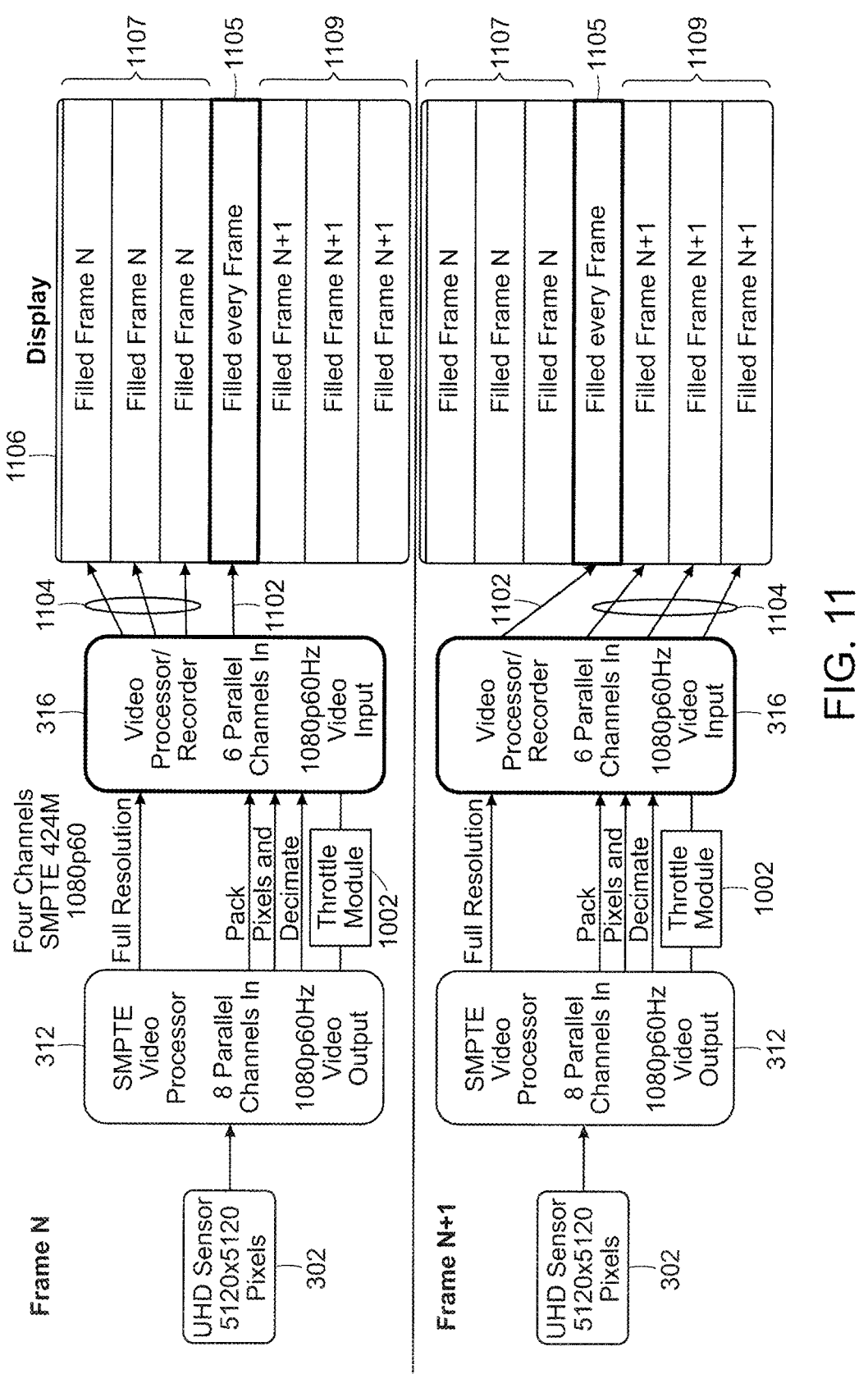
FIG. 11 is diagram of an illustrative embodiment of a UHD sensor data processing system including a throttle module configured for transporting different frames of an image at different data rates according to an aspect of the present disclosure.

Referring to FIG. 11, in an illustrative embodiment, a user selects an HD image region by identifying it as critical region. The throttle module 1002 is configured to identify image data in the critical region and transport the data corresponding to the critical region at full rate along one channel 1102 to critical area memory space 1105 of a display 1106. In an illustrative embodiment, data for the critical region is transported as unpacked pixels to the display 1106 on every output cycle of the throttle module 1002 so that every frame in the critical region that is received from the image sensor 302 is transported to the display 1106.

The throttle module 1002 allocates the remaining available connections to transport the remaining video and associated metadata as packed pixels (2 pixels for every 16 bits in the SMPTE stream). The packed pixels are unpacked based on the associated metadata and transported to non-critical area memory space 1107, 1109 the display 1106 along a number of parallel channels 1104 at less than the full rate. In the illustrative embodiment, the throttle module 1002 sends alternating portions of the data received from the image sensor 302 for areas outside of the critical area to the non-critical area of memory space 1107, 1109 of the display 1106 on every other output cycle of the throttle module 1002. For example, in this embodiment, the throttle module 1002 couples a first non-critical area of memory space 1107 to the parallel channels 1104 on even numbered (N) frame cycles of the throttle module 1002, and couples a second non-critical area 1109 of memory space to parallel channels 1104 on odd numbered (N+1) frame cycles of the throttle module 1002. In this embodiment, different non-critical regions of each image received from image sensor 302 are updated in the display 1106 every other cycle in an alternating sequence while critical regions of each image received from the image sensor 302 are updated on every cycle.

Although FIG. 11 is described with respect to one critical region of an image and a number of non-critical regions of the image, it should be understood that alternative embodiments of the disclosed system and method could be implemented in which multiple critical areas are pre-determined or selected by a user. Persons skilled in the art should understand that various alternative multiplexing techniques may be used by the throttle module to transport a number of critical regions of images from the image sensor 302 to the display 1106 at a higher transport rate than non-critical regions of the images.

A method of transporting video data from a UHD image sensor 302 according to an aspect of the present disclosure is described with reference to FIG. 12. In an illustrative embodiment, one or more steps of the method 1200 may be performed by the throttle module 1002 of FIG. 10 and FIG. 11, for example. The method 1200 includes receiving from the UHD image sensor 302 a stream of images, wherein each of the images includes a number of UHD frames at step 1202 and identifying one or more of the UHD frames as selected frames for each image based on a position of the selected frames within the images at step 1204. The method 1200 also includes transporting the selected frames over a first set of data paths at full resolution and at a first frame transmission rate at step 1206 and transporting other frames of each image over a second set of data paths at a second frame transmission rate lower than the first frame transmission rate at step 1208. The selected frames may include the center of each of the images, and the other frames include edge portions of each of the images, for example. In an illustrative embodiment, the other frames may be transported over the second set of data paths at a reduced resolution.

In another illustrative embodiment, the method 1200 may also include designating data paths in the second set of data paths as members of a number of subsets of data paths, and transporting video data on only one of the subsets of data paths at a time at the second frame transmission rate. In this embodiment, the second frame transmission rate may be a fraction of the first transmission rate, for example.

While aspects of the present disclosure have been particularly shown and described with reference to the exemplary embodiments thereof, it will be understood by those of ordinary skill in the art that various changes in form and detail may be made therein without departing from the scope of the present disclosure as defined by the following claims.

The invention claimed is:

1. A method for transporting video data, comprising:
coupling an ultra high definition (UHD) image sensor to a plurality of Society of Motion Picture and Television Engineers (SMPTE) data paths;
coupling a display memory to the plurality of SMPTE data paths;
transporting image data in a critical region of an image output by the UHD image sensor to a first designated space of the display memory on the SMPTE data paths, wherein the first designated space is designated for receiving only image data in the critical region; and
transporting image data in a non-critical region of the image to a second designated space of the display memory on the SMPTE data paths, wherein the second designated space is different from the first designated memory space.

2. The method of claim 1, comprising transporting image data in the critical region on every frame cycle.

3. The method of claim 2, comprising transporting image data in the non-critical region on alternating frame cycles.

4. The method of claim 3, comprising transporting image data in the non-critical region to update a first sub-region of the non-critical region in even frame cycles and a second, different sub-region of the non-critical region in odd frame cycles.

5. The method of claim 1, comprising transporting the critical region as lossless raw data from the UHD image sensor.

6. The method of claim 1, comprising receiving, from a user, a selection of the critical region.

7. The method of claim 1, comprising transporting the image data in a 1080p60 video format.

8. The method of claim 1, comprising packing the image data in the non-critical region before transporting the image data.

9. An apparatus for transporting video data, comprising:
an ultra high definition (UHD) image sensor;
a plurality of Society of Motion Picture and Television Engineers (SMPTE) data paths coupled to the UHD image sensor;
a display memory coupled to the plurality of SMPTE data paths;
a video processor configured to:
transport image data in a critical region of an image output by the UHD image sensor to a first designated space of the display memory on the SMPTE data paths, wherein the first designated space is designated for receiving only image data in the critical region; and transport image data in a non-critical region of the image to a second designated space of the display memory on the SMPTE data paths, wherein the second designated space is different from the first designated memory space.

10. The apparatus of claim 9, wherein the video processor is configured to transport image data in the critical region on every frame cycle.

11. The apparatus of claim 10, wherein the video processor is configured to transport image data in the non-critical region on alternating frame cycles.

12. The apparatus of claim 11, wherein the video processor is configured to transport image data in the non-critical region to update a first sub-region of the non-critical region in even frame cycles and a second, different sub-region of the non-critical region in odd frame cycles.

13. The apparatus of claim 9, wherein the video processor is configured to transport the critical region as lossless raw data from the UHD image sensor.

14. The apparatus of claim 9, wherein the video processor is configured to receive, from a user, a selection of the critical region.

15. The apparatus of claim 9, wherein the video processor is configured to transport the image data in a 1080p60 video format.

16. The apparatus of claim 9, wherein the video processor is configured to pack the image data in the non-critical region before transporting the image data.

* * * * *